(12) United States Patent
Heine et al.

(10) Patent No.: US 6,391,247 B1
(45) Date of Patent: May 21, 2002

(54) FLAT INDUCTORS

(75) Inventors: Hans G. Heine, San Mateo, FL (US); John H. Mortimer, Medford, NJ (US); Vitaly A. Peysakhovich, Moorestown, NJ (US); John C. Thorpe, Edgewater Park, NJ (US)

(73) Assignee: Inductotherm Corp., Rancocas, NJ (US)

( * ) Notice: Subject to any disclaimer, the term of this patent is extended or adjusted under 35 U.S.C. 154(b) by 0 days.

(21) Appl. No.: 09/652,093

(22) Filed: Aug. 31, 2000

Related U.S. Application Data
(60) Provisional application No. 60/155,291, filed on Sep. 21, 1999.

(51) Int. Cl.[7] ............................................. C21B 13/00
(52) U.S. Cl. ........................ 266/44; 266/234; 266/237
(58) Field of Search .................................. 266/234, 237, 266/45, 44; 373/155, 162, 164

(56) References Cited

U.S. PATENT DOCUMENTS 5,901,170 A * 5/1999 Peysakhovich et al. ..... 373/155

* cited by examiner

Primary Examiner—Scott Kastler
(74) Attorney, Agent, or Firm—Philip O. Post

(57) ABSTRACT

A flat inductor heating system for inducing heat in a variety of applications including heating, melting and holding a melt at temperature. The system may also be used to stir the melt. The system includes at least one flat induction coil cast in an aggregate of shot and a binding material. The aggregate serves to direct magnetic flux to the melt, thereby improving efficiency. The system is situated above a refractory holding the melt and may either rest on the refractory or be raised and lowered into and out of the refractory.

15 Claims, 3 Drawing Sheets

FLAT INDUCTORS

CROSS-REFERENCE TO RELATED APPLICATIONS

This application claims the benefit of U.S. Provisional Application No. 60/155,291 filed Sep. 21, 1999.

FIELD OF THE INVENTION

The present invention generally relates to flat inductors. More specifically, the present invention relates to flat inductors for induction heating, melting, or holding metal at temperature.

BACKGROUND OF THE INVENTION

Flat inductors are generally known and used in induction applications. They are used primarily in induction heating applications. In order to achieve a reasonable electrical efficiency using flat inductors, it is essential to keep the distance between the flat inductor coil and the load small and relatively constant.

In melting applications, the induction coil must typically be separated from the liquid metal by refractory materials, necessarily increasing the distance between the melt and the coil and thereby decreasing efficiency. This low efficiency has prevented the use of flat inductors for melting applications.

In addition, in induction heating and melting, one wishes to avoid heating metal parts adjacent to a workpiece or charge. This requires guiding the magnetic flux produced by the induction coil from the backside and circumference of an-induction coil with shunts. This is conventionally achieved using shunts made from laminated steel. Due to the complexity of the shunts, they are difficult and expensive to make.

Because of these perceived drawbacks, induction heating and melting are not considered viable in some industries. Typically, the aluminum industry, for example, melts and holds metal at high temperatures using gas burners. Large holding furnaces are used, typically in the range of 100,000 to 200,000 pounds of capacity. The use of gas burners presents several disadvantages. When burners above the voluminous metal bath are used, the metal is held at temperature through radiation due to temperature differences between the flame and the metal in the upper section of the furnace. Thermal energy is usually transferred throughout the metal bath through a layer of dross. Therefore, the further the metal resides from the burner the more difficult it is to heat and hold the metal at temperature. Every gas burner requires an exhaust and the thermal efficiency is limited to the burner itself. Because the burners transfer heat only through radiation, they do not produce a stirring action. The industry has tried mechanical stirrers as well as electromagnetic stirrers. While mechanical stirrers are not expensive to produce and install, they require significant maintenance, thereby increasing operational costs. Electromagnetic stirrers have been applied either under the furnace, or on the side, but they are quite expensive to operate.

Other drawbacks of gas burners include significant air pollution, temperature control, and high refractory costs due to exposure to high temperatures.

The present invention makes it possible to heat and stir metals by induction, which eliminates the drawbacks of gas burners.

SUMMARY OF THE INVENTION

The present invention provides a flat inductor heating system comprising a flat induction coil and a housing for the inductor coil. The housing comprises a thermal insulating layer abutting the induction coil and an enclosure engaging the insulating layer to enclose the induction coil. An aggregate material comprising a mixture of shot and a binding material reside in the housing, consuming all space within the housing about the induction coil.

The flat inductor heating system may also include a support for suspending the housing and aggregate material above a vessel that holds a metal to be inductively heated, melted and/or stirred by the flat inductor system. A drive mechanism cooperating with the support moves the housing either toward or away from the vessel. A sensor may be provided for sensing the distance between the housing and the surface of the metal in the vessel. The sensor may be coupled to a controller for actuating the drive mechanism in response to a signal from the sensor.

Three induction coils maybe arranged in the housing and connected to a three-phase supply having each phase 120 electrical degrees out of phase with respect to the other two phases. Each of the three phases is connected to one of the three induction coils.

BRIEF DESCRIPTION OF THE DRAWINGS

For the purpose of illustrating the invention, there is shown in the drawings a form which is presently preferred. It being understood, however, that this invention is not limited to the precise arrangements and instrumentalities shown.

DETAILED DESCRIPTION OF THE INVENTION

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

When using inductors for heating systems, in order to avoid heating metal parts adjacent to the workpiece or melt and to achieve the highest efficiency, it is important to guide the magnetic flux from the backside and the circumference of the induction coil. Conventional flat inductors have used laminated steel shunts to accomplish this task. The present invention provides a system which casts the induction coil in a mixture of a metallic shot, such as iron or steel shot (formed, for example, in the shape of a BB) and a binding media. The coil/aggregate combination is then housed in an enclosure of non-magnetic material, such as aluminum. This design results in substantial cost saving in material and manufacturing, provides improved support to the induction coil, and provides a flux field distribution which allows for the coil to be placed further from the load while maintaining satisfactory efficiency.

While the design allows for increased distance to load, for melting or holding applications it is still highly desirable to keep the coil as close as possible to the bath or load.

Therefore, instead of mounting the flat inductor below or on the side of a holding vessel, the coil housing is maintained above the bath. Since there is no contact with liquid metal there is no need for thick layers of refractory material. Therefore, a relatively thin layer of a thermal insulating material may be provided on the coil housing between the coil and the bath. This arrangement increases the efficiency of the inductor.

Since it is important to maintain a fairly constant, close distance between the load and the inductor, the housing can be coupled to an adjustable height device for providing vertical movement. The device can be, for example, a pulley system. For melting and metal holding applications, where the bath level may be raised or lowered, it is very important to be able to vertically adjust the coil housing to maintain a constant, close distance between the coil and the melt.

However, for metal coating or galvanizing (i.e., running a metal workpiece, such as a metal strip, through a vessel containing a melt) applications, the bath level is usually maintained at a constant level. Therefore, the coil housing can be maintained in a resting position on a vessel refractory.

With reference to the figures, wherein like numerals refer to like elements, the present invention will now be described in detail.

Figure 1:
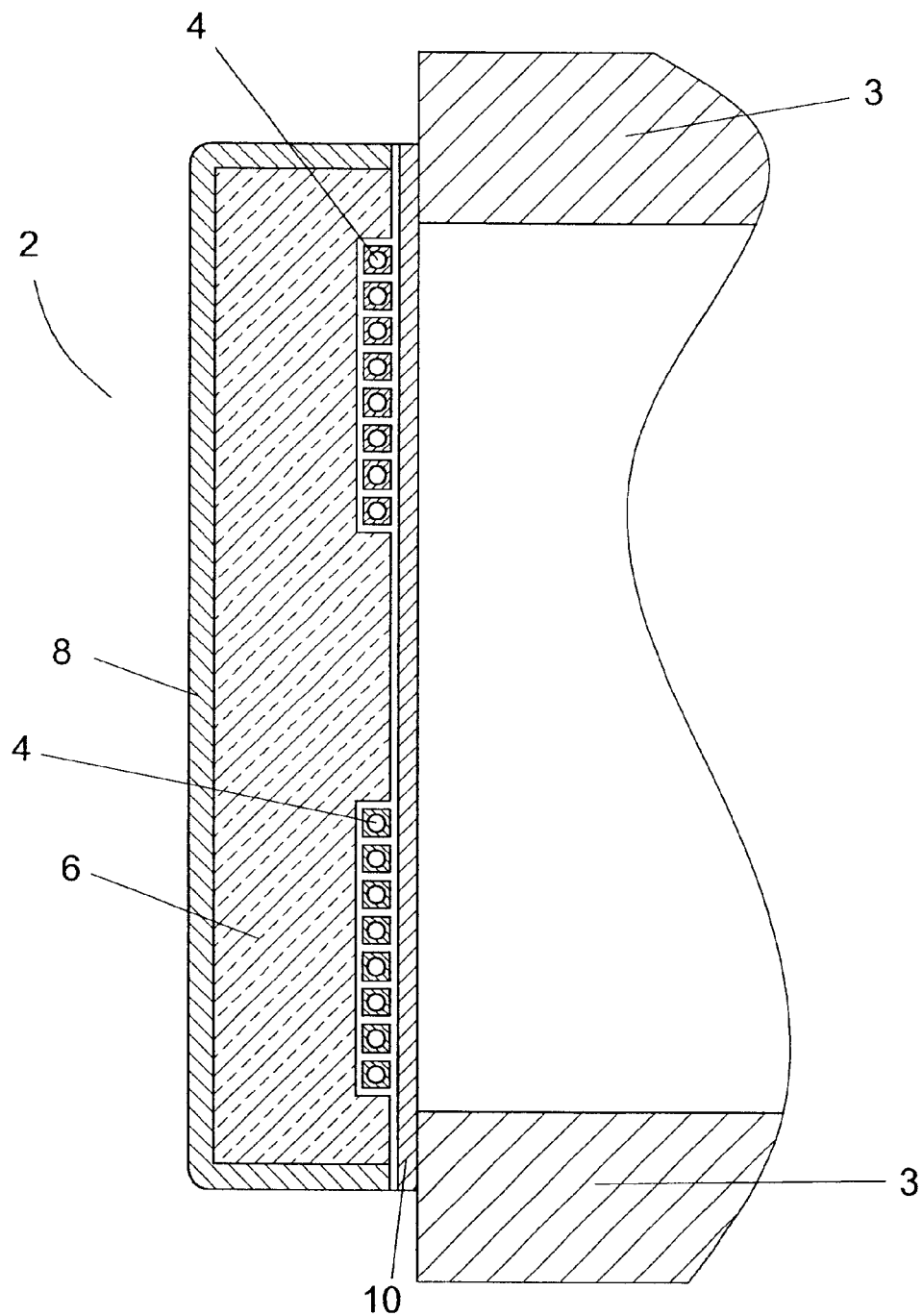
FIG. 1 is a partial cross sectional view of a vessel with a conventional flat inductor utilizing laminated shunts.

FIG. 1 illustrates a conventional flat inductor assembly 2 positioned on the side of a vessel 3 (partially shown). The assembly 2 comprises one or more flat induction coils 4 surrounded by shunts 6. The shunts 6 are typically made of laminated steel or a material providing similar magnetic properties. The shunts 6 surround the coil 4 and direct magnetic flux towards a workpiece (not shown) in vessel 3. The assembly 2 further includes an enclosure 8 for containing the coil 4 and shunts 6, and an insulator 10 for insulating the assembly 2 from heat generated in the workpiece.

Figure 2:
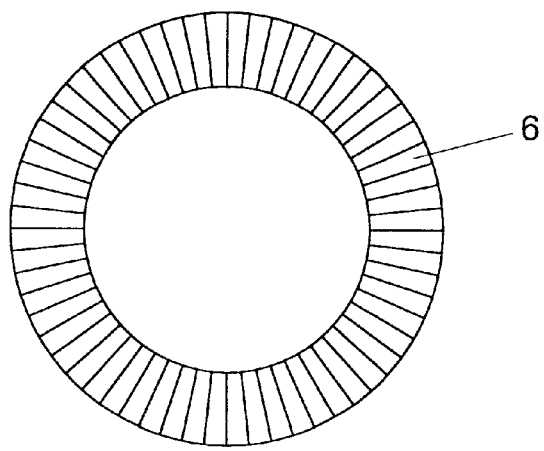
FIG. 2 is a top view of the vessel shown in FIG. 1, illustrating only the laminated shunts.

FIG. 2 is an overhead view of the assembly 2 showing only the laminated shunts 6 surrounding the vessel.

Figure 3:
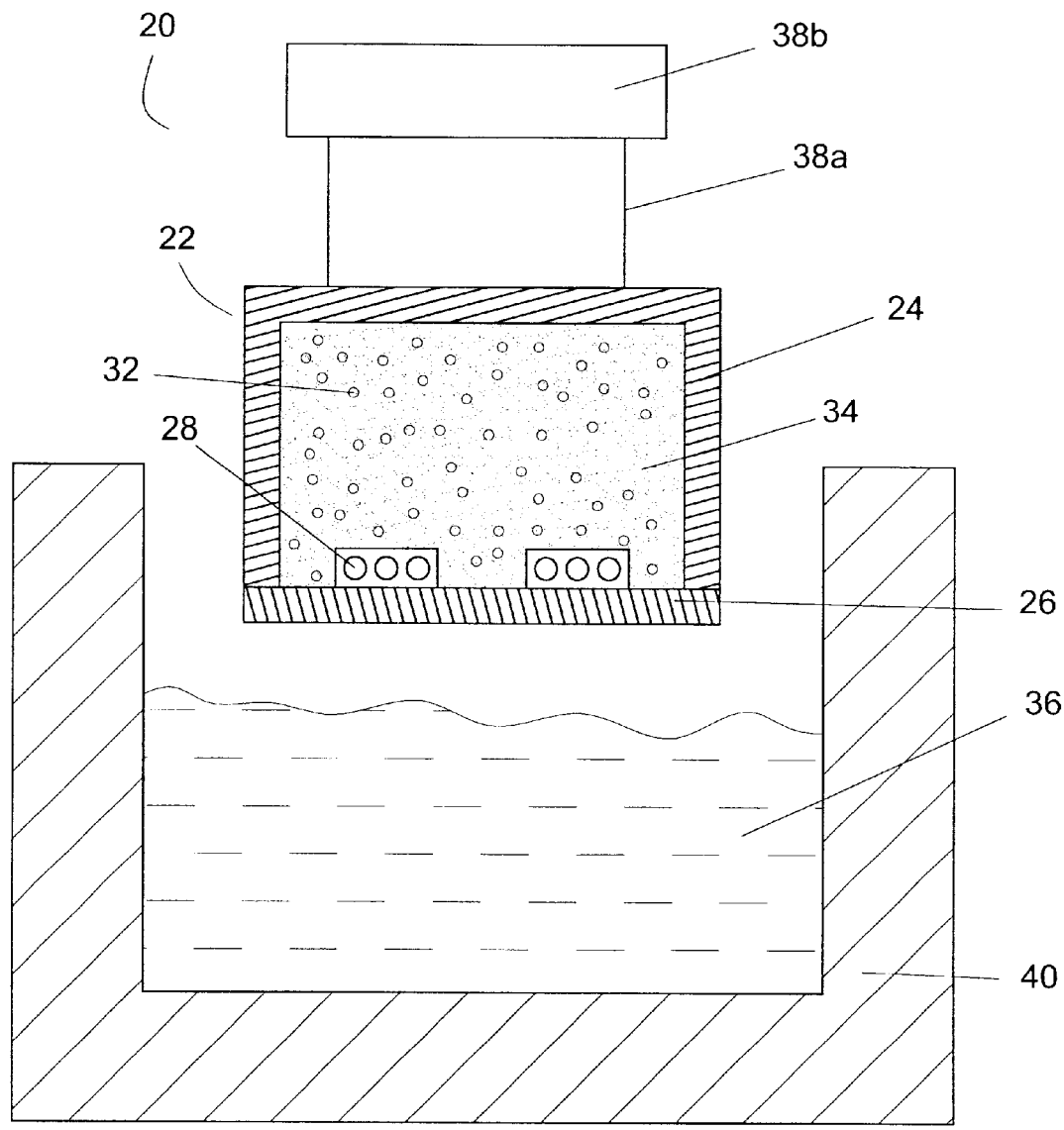
FIG. 3 is a sectional view of an embodiment of the present invention positioned relative to a refractory vessel.

FIG. 3 illustrates an embodiment of a flat inductor system 20 according to the present invention. The system 20 may be used for induction heating, melting, or holding metal at temperature. The embodiment illustrated in FIG. 3 is preferably used for holding metal at temperature but may be used in other applications.

The system 20 includes a housing 22. Housing 22 has an enclosure 24 and an insulating layer 26. The housing contains one or more flat induction coils 28. Each coil 28 is cast in an aggregate that includes a mixture of shot (formed, for example, in the shape of a BB) 32 and a binding material 34. The binding material 34 may be concrete, epoxy, sand or silicone, for example. The shot 32 may be iron or oxidized steel coated without a primer. The binding material 34 serves to hold the shot 32 in place relative to coil 28. The aggregate surrounds coil 28 on all sides except between the coil 28 and the insulating layer 26. The aggregate serves to direct magnetic flux generated by coil 28 towards a workpiece, such as melt 36, in order to provide maximum efficiency. The resultant flux field improves the system's distance efficiency factor significantly, compared to prior systems, thereby allowing the flat induction coil 28 to be located further away from melt 36. Generally, as shown in FIG. 3, the resultant flux field penetrates down into melt 36 as opposed to laterally through the melt.

Notwithstanding the improved distance efficiency factor achieved by using shot 32 and binding material 34, in melting or holding applications of liquid metal it is still important to keep the distance between coil 28 and melt 36 to a minimum. To this end, housing 22 is suspended above the melt, as illustrated in FIG. 3, rather than being mounted in the flat inductor coil below or on the side of a vessel. Since housing 22 is maintained above the liquid melt 36 without any contact with liquid metal, there is no need for thick layers of refractory material between housing 22 and melt 36. Insulator 26 may be a relatively thin layer of suitable thermal insulating material sufficient to prevent heat radiating from melt 36 from affecting coil 28. A thickness of about one inch is suitable for insulator 26. This, of course, may vary from application to application. The use of a thin insulator further improves the efficiency of system 20.

As stated above, it is highly desirable to maintain a relatively close proximity between coil 28 and melt 36 in order to maintain high efficiency. It is not uncommon for the surface level of melt 36 to change in melting and temperature holding applications. The level may change due to removal of some of the metal from the bath, addition of material to alloy the melt, or removal of a dross layer. In light of this possibility, it is desirable for housing 22 to be vertically adjustable. To this end system 20 may include a sensor (not shown), for example a capacitive sensor, to sense the level of melt 36. The sensor is coupled to automatic controls which control the height of housing 22. In an embodiment having only one coil 28 (i.e., a relatively lightweight housing), the controls could be linked to a supporting cable system having support cables 38a and cable hoist 38b, for example. In an embodiment having more than one coil 28 (i.e., a relatively heavy housing), the controls could be linked to jack screws and supports or hydraulics with guide rails, for example.

A typical interior of a cylindrical vessel 40 for holding a metal bath is on the order of 24 inches in diameter and 30 inches in depth. The surface level of melt 36 can range from slightly more than zero to 30 inches. Housing 22 must be adjustable to keep coil 28 preferably about 2 inches from the level of melt 36. A 2-inch gap between melt 36 and coil 28 provides a relatively high efficiency of about 60 percent.

A further advantage of the invention is that the magnetic field created by the flow of current through induction coil 28 generates a mild stirring action in melt 36, in addition to supplying heat directly to the melt. This stirring action is advantageous for heating melt 36 more quickly in melting applications and for mixing when adding alloy material to the melt, so that uniform distribution of alloy material in the melt is obtained.

To improve the stirring action, three separate inductors may be maintained above melt 36. For heating and melting, single phase (in-phase) power is supplied to each coil for heating melt 36. For stirring of melt 36, each of the three coils is supplied with power from a separate phase of a three-phase electrical source having phase currents that are 120° out-of-phase relative to each other. The relative phase shifts generate mechanical forces in melt 36 that are analogous to forces generated in a three-phase linear motor. While the three-phase operation provides less heating, it provides a considerable stirring action. More generally, the three phases need only to be out of phase and not approximately 120° out-of-phase to induce a stirring action.

Coil 28 may have any shape in plan view including, but not limited to circular, oval, rectangular or square. The coil shape may be selected based upon application and materials involved. Further, coil 28 may consist of a single coil with one or more turns or a multiplicity of separate coils, each with one or more turns.

Figure 4:
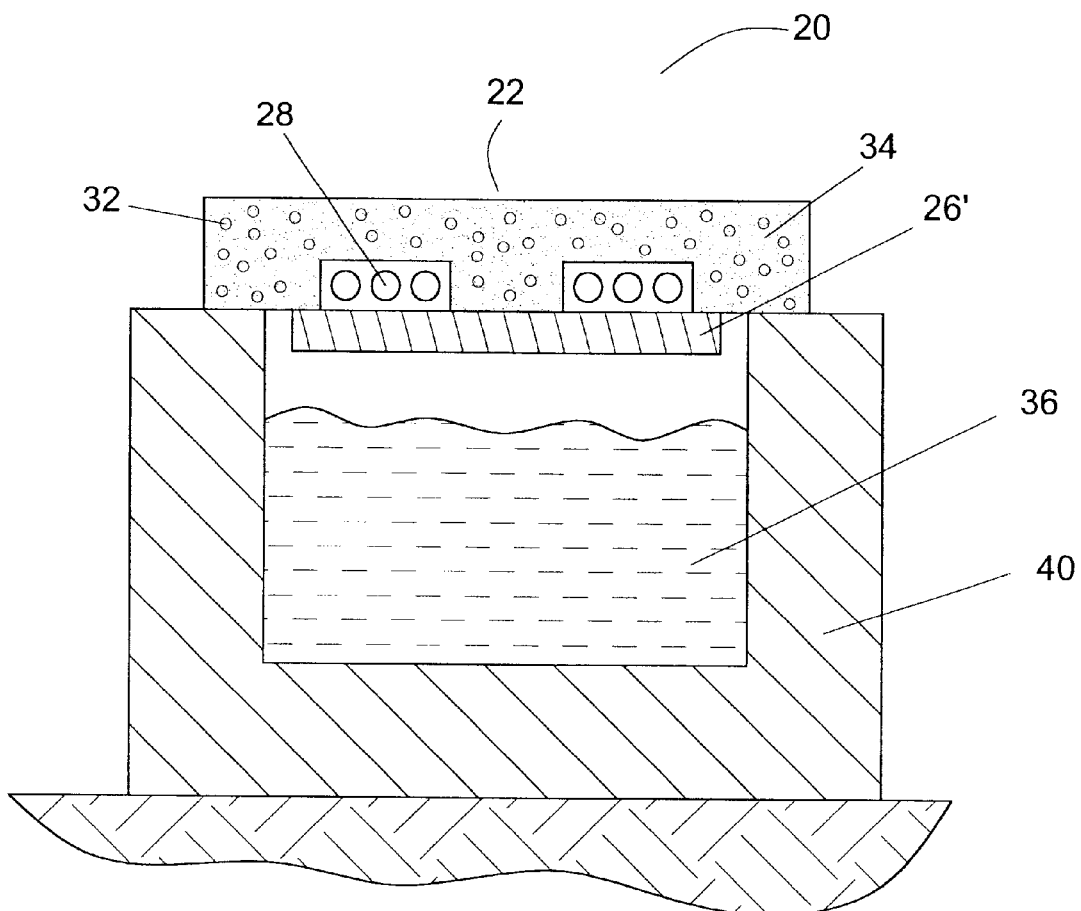
FIG. 4 is a sectional view of another embodiment of the present invention relative to a refractory vessel.

In heating, galvanizing, and some temperature maintenance applications, wherein material levels remain more or less constant, housing 22 may rest on vessel 40, as illustrated in the embodiment of FIG. 4. The outer periphery of the housing rests upon the vertical walls of vessel 40. In this embodiment housing 22 will remain stationary during the heating process. This embodiment may utilize a slightly different insulator 26'. The insulator 26' may reside within vessel 40 below the top plane of the vertical walls. This arrangement allows coil 28 to rest closer to melt 36.

The present invention provides an induction heating system utilizing flat inductors capable of increased efficiency when compared to other induction and to non-induction heating methods.

It also provides a heating system which does not require exhaust, produces minimal pollution, allows for accurate temperature control, enables stirring without the need for separate stirring devices, and provides reduced oxide formation.

The present invention further provides an induction heating system that has improved temperature and alloy distribution for heating, melting, or holding metal at temperature.

The present invention may be embodied in other specific forms without departing from the spirit or essential attributes thereof and, accordingly, reference should be made to the appended claims, rather than to the foregoing specification, as indicating the scope of the invention.

What is claimed is:

1. Apparatus for induction heat treatment or stirring of a metal, comprising:
    a vessel having an interior for holding the metal;
    a housing unattached from the vessel, the housing comprising:
        a one or more substantially flat induction coil disposed in the housing;
        a thermal insulator substantially forming a side of the housing facing the interior of the vessel, the one or more substantially flat induction coil disposed adjacent to the thermal insulator;
        an aggregate material substantially filling the housing and surrounding the induction coil, the aggregate material comprising a mixture of a metallic shot and a binder; and
    a means to alternatively raise and lower the housing in the interior of the vessel.

2. The apparatus according to claim 1, wherein the means to alternatively raise and lower the housing comprises:
    a support for suspending the housing above the vessel; and
    a drive mechanism cooperating with the support for alternatively moving the housing toward and away from the vessel.

3. The apparatus according to claim 2, further comprising a sensor for sensing distance between the housing and the level of the metal in the vessel.

4. The apparatus according to claim 3, further comprising a controller coupled to the sensor for actuating the drive mechanism in response to a signal from the sensor.

5. The apparatus according to claim 1, wherein the metallic shot comprises a ferrous metal.

6. A method for heat treatment or stirring of a metal comprising the steps of:
    placing at least one substantially flat induction coil in an aggregate material consisting essentially of a metallic shot distributed within a binder while leaving a one planar surface of said at least one substantially flat induction coil substantially exposed;
    placing a thermal insulator over said one planar surface of said at least one substantially flat induction coil;
    orienting said at least one substantially flat induction coil so that said one planar surface of said at least one substantially flat induction coil faces a variable surface level of the metal in a vessel unattached to said at least one substantially flat induction coil;
    bringing said at least one substantially flat induction coil near to the variable surface level of the metal; and
    applying electrical power to each one of the said at least one substantially flat induction coil to inductively heat, melt or stir the metal.

7. The method according to claim 6 further comprising the step of moving said at least one substantially flat inductor away from or towards the variable surface level of the metal responsive to a change in the variable surface level.

8. The method according to claim 6 wherein applying electrical power to each one of said at least one substantially flat induction coil is accomplished by applying one phase of a multi-phase electrical power source to each one of said at least one substantially flat induction coil.

9. Apparatus for induction heat treatment or stirring of a metal, the apparatus comprising:
    a vessel having an interior for holding the metal;
    a housing unattached to the vessel, the housing comprising:
        a one or more substantially flat induction coil disposed in the housing;
        a thermal insulator substantially forming a side of the housing facing the interior of the vessel, the one or more substantially flat induction coil disposed adjacent to the thermal insulator; and
        an aggregate material substantially filing the housing and surrounding the induction coil, the aggregate material comprising a mixture of a metallic shot and a binder;
    a support to suspend the housing above the vessel; and
    a drive mechanism cooperating with the support to alternatively raise and lower the housing in the interior of the vessel.

10. The apparatus of claim 9, further comprising a sensor for sensing distance between the housing and a level of the metal in the vessel.

11. The apparatus of claim 10, further comprising a controller coupled to the sensor for actuating the drive mechanism in response to a signal from the sensor.

12. The apparatus of claim 9 wherein the one or more substantially flat inductor coil comprises a three coils disposed in a common plane.

13. The apparatus of claim 12 further comprising a power supply for supplying three phase electrical power to the three coils whereby power to each one of the three coils is approximately 120 electrical degrees out of phase with respect to power to each other two of the three coils.

14. A method for heat treatment or stirring of a metal comprising the steps of:
    placing a one or more substantially flat induction coil in an aggregate material consisting essentially of a metallic shot distributed within a binder while leaving a one planar surface of the one or more substantially flat induction coil substantially exposed;
    placing a thermal insulator over the one planar surface;
    orienting the one or more substantially flat induction coil so that said one planar surface of the one or more substantially flat induction coil faces a variable surface level of the metal in a vessel unattached to the one or more substantially flat induction coil;
    bringing the one or more substantially flat induction coil near to the variable surface level of the metal;
    applying electrical power to each one of the one or more substantially flat induction coil to inductively heat, melt or stir the metal; and moving said at least one substantially flat inductor away from or towards the variable surface level of the metal responsive to a change in the variable surface level.

15. The method according to claim 14 wherein applying electrical power to each one of the one or more substantially flat induction coil is accomplished by applying one phase of a multiple phase electrical power source to each one of the one or more substantially flat induction coil.

* * * * *